Patented Nov. 16, 1926.

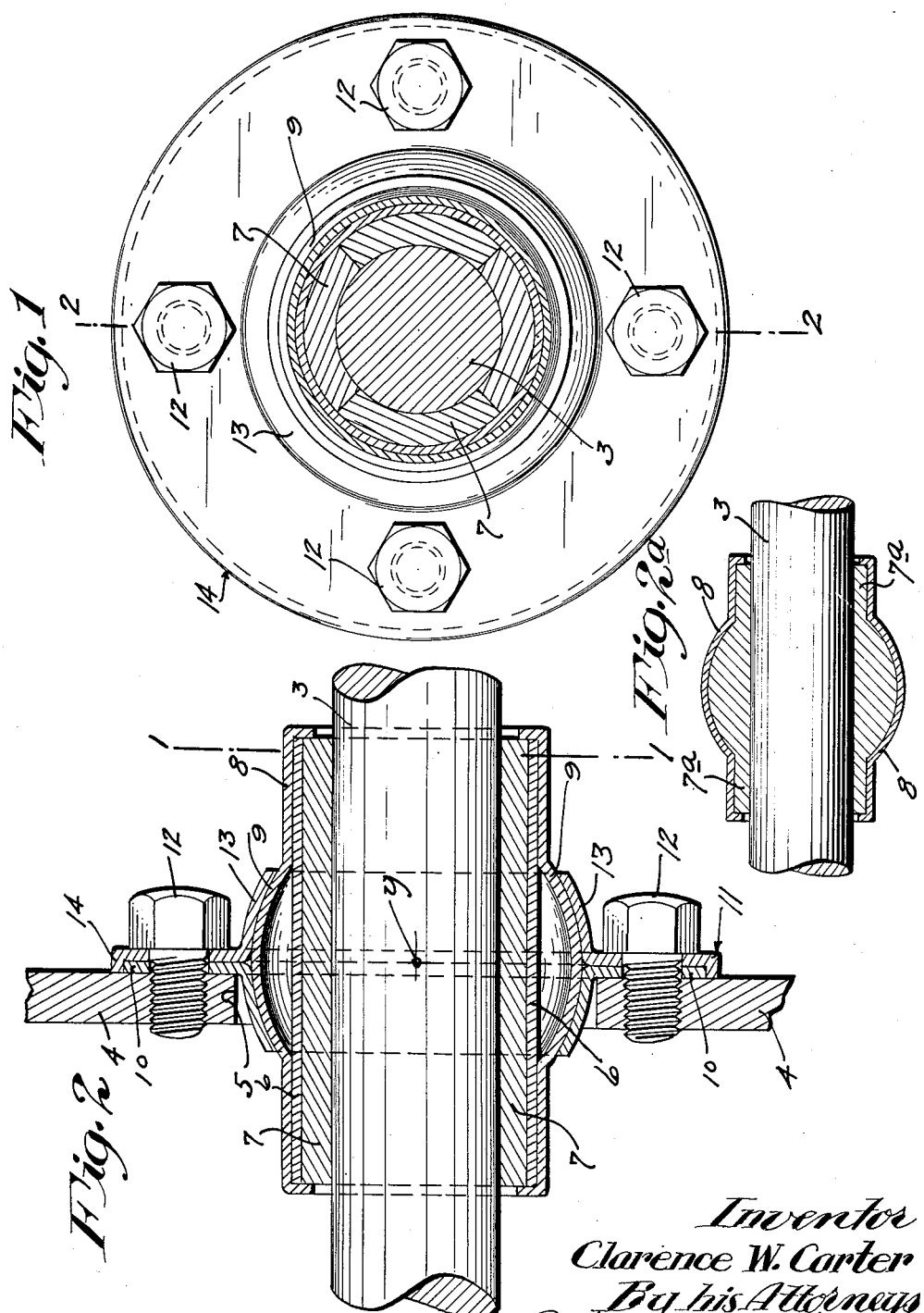

1,606,747

UNITED STATES PATENT OFFICE.

CLARENCE W. CARTER, OF MINNEAPOLIS, MINNESOTA.

SELF-ADJUSTABLE SHAFT BEARING.

Application filed August 27, 1923. Serial No. 659,439.

My invention has for its object to provide an extremely simple and highly efficient shaft bearing that is angularly adjustable or self-alignable to the natural axis of the shaft journaled therein. Any two such bearings will align themselves to the angle of a shaft journaled therein within, of course, certain limited degrees of variation. Such construction is highly desirable in various kinds of machines where the bearings and their supports and various other parts, for cheapness of construction, are not machined or made with great accuracy.

The feature above broadly indicated is not novel nor herein broadly claimed, but the invention involves various important novel features which make the structure not only cheap to make but strong and durable and of very high efficiency.

In the accompanying drawings, which illustrate the invention, like characters indicate like parts throughout the several views.

Referring to the drawings:

Fig. 1 is a transverse vertical section taken on the line 1—1 of Fig. 2;

Fig. 2 is an axial section taken on the line 2—2 of Fig. 1, the said views illustrating my invention in what I, at present, believe to be its most improved commercial form; and Fig. 2$^a$ is an axial section illustrating a modified form of the sleeve.

The shaft is indicated by the numeral 3. The numeral 4 indicates what may, for definiteness, be assumed to be one end of a frame hopper or the like to which one of the bearings is applied. For the application of the improved bearings, the supporting plate 4 is spaced with sufficient clearance to permit the application of the improved bearing.

The improved bearing comprises a bearing sleeve, a cylindrical jacket for the sleeve, and a divided or split saddle for the jacket. The bearing sleeve comprises a quite thin metallic tube 6, preferably a section of open seam steel tubing, and an end grain wooden bushing or lining 7, which latter is made up of a plurality of segments tightly forced into the tube 6. The wooden bushing 7 is advisably thoroughly impregnated with lubricating oil so that the bearing will not require oiling, or at any rate will not require frequent oiling. The bushing, of course, closely fits the shaft 3.

The bearing sleeve made up of the tube 6 and bushing 7 is securely held within a cylindrical metallic jacket 8, the central portion of which is outwardly bulged to form an annular truncated spherical bearing surface 9. The ends of the jacket 8 are turned inward so that they overlap the ends of the tube 6 and portions of the ends of the bushing 7 and thereby securely hold the three elements 6, 7 and 8 assembled substantially as a single unit. The jacket 8 may be formed from a section of cold rolled steel tubing, or drawn from sheet steel.

For holding the jacket against the sleeve therein contained with freedom for angular universal wabbling movements on a point that is the center $y$ of the spherical surface 9, I provide an annular saddle made up of two annular plates or members 10 and 11 that will be firmly clamped together and, as shown, also clamped onto the supporting plate 4 by means of screws 12. At their inner portions, the plates 10 and 11 are provided with reversely projecting annular bearing flanges 13 that together form a truncated spherical holder for engagement with the spherical bearing surface 9 of the jacket 8. It is important to note that the outer edges of the spherical flanges 13 are not as far extended as is the conical bearing surface 9, which feature permits the jacket and bearing sleeve to universally move angularly in any and all directions on the central point $y$. The extreme outer edge of the bearing plate 11 is shown as bent laterally to afford a marginal flange 14 that closely surrounds the outer edge of the plate 10 and thus keeps the two conical flanges 13 positively aligned.

By reference to Fig. 2 it will be noted that in this preferred manner of applying the bearing, one of the conical flanges 13 projects through the passage 5 of supporting plate 4. There is nothing positive to prevent the jacket 8 and enclosed sleeve from rotating with the shaft, but as the friction between the shaft and the bushing is much less than the friction between the conical portions 9 and 13, the said jacket and sleeve will not rotate in practice, nor unless some external force be applied to the jacket. However, by proper application of force to the jacket it may from time to time be rotated more or less so as to cause different parts of the bushing to support the weight of the shaft.

In Fig. 2$^a$, the sleeve 7$^a$ contained within the jacket 8 is formed by casting babbitt into the same and around the shaft 3 or around a core corresponding in size to the shaft 3.

What I claim is:

1. In a shaft bearing, a bearing sleeve including a non-metallic bushing, a jacket surrounding said sleeve and provided with a convex truncated spherical bearing surface, and a two-part saddle having concave spherical bearing surfaces that engage the conical surface of said jacket and hold the same for limited universal angular movements.

2. In a shaft bearing, a bearing sleeve comprising a metallic tube and a wooden bushing therefor, a jacket surrounding said sleeve and provided with a convex truncated spherical bearing surface, and a two-part saddle having reversely truncated spherical flanges engaging the conical surface of said jacket and holding the same for limited universal angular movements on a point that is the center of said spherical surface.

In testimony whereof I affix my signature.

CLARENCE W. CARTER.